US008255170B2

(12) United States Patent
Kollgaard et al.

(10) Patent No.: US 8,255,170 B2
(45) Date of Patent: Aug. 28, 2012

(54) REMOTE NONDESTRUCTIVE INSPECTION SYSTEMS AND METHODS

(75) Inventors: Jeffrey R. Kollgaard, Kent, WA (US); Gary E. Georgeson, Federal Way, WA (US); Blake A. Bertrand, Port Orchard, WA (US); Richard H. Bossi, Renton, WA (US)

(73) Assignee: The Boeing Company, Chicago, IL (US)

( * ) Notice: Subject to any disclaimer, the term of this patent is extended or adjusted under 35 U.S.C. 154(b) by 1142 days.

(21) Appl. No.: 11/555,953

(22) Filed: Nov. 2, 2006

(65) Prior Publication Data
US 2008/0109187 A1    May 8, 2008

(51) Int. Cl.
*G01B 3/44* (2006.01)
*G06F 11/00* (2006.01)

(52) U.S. Cl. .............. 702/34; 73/614; 702/35; 702/188; 707/104.1

(58) Field of Classification Search .................... 702/34, 702/36, 184–188, 35; 707/102, 104.1; 706/45; 701/24, 29; 700/103, 104, 106; 73/614
See application file for complete search history.

(56) References Cited

U.S. PATENT DOCUMENTS

| 5,327,358 | A | * | 7/1994 | Stubbs ........................... 702/36 |
| 5,473,953 | A | | 12/1995 | Appel |
| 6,950,829 | B2 | * | 9/2005 | Schlabach et al. .................... 1/1 |
| 7,333,898 | B2 | * | 2/2008 | Griess et al. .................... 702/35 |
| 7,562,576 | B2 | * | 7/2009 | Fetzer et al. .................... 73/614 |
| 2003/0089183 | A1 | | 5/2003 | Jacobsen et al. |
| 2004/0064762 | A1 | | 4/2004 | Deshpande |
| 2006/0136104 | A1 | | 6/2006 | Brozovich |

FOREIGN PATENT DOCUMENTS

| EP | 0977055 | 2/2000 |
| EP | 1195 681 | 4/2002 |
| WO | WO 01/82136 A2 | 11/2001 |

* cited by examiner

*Primary Examiner* — John H Le
(74) *Attorney, Agent, or Firm* — Haynes and Boone, LLP

(57) ABSTRACT

Systems and methods are disclosed for providing nondestructive inspection (NDI) services. For example in accordance with an embodiment of the invention, a system for remote inspection includes a nondestructive inspection (NDI) system configured to examine a structure and provide NDI data related to a damage condition of the structure, the NDI system being configured to communicate the NDI data to a remote location; and a remote computer disposed at the remote location, the remote computer being configured to receive the NDI data and provide the received NDI data for a review, the remote computer being configured to communicate an analytical result based on the review to the NDI system, the analytical result including a repair disposition decision corresponding to the damage condition.

16 Claims, 5 Drawing Sheets

REMOTE NONDESTRUCTIVE INSPECTION SYSTEMS AND METHODS

TECHNICAL FIELD

The invention relates generally to nondestructive inspection techniques.

BACKGROUND

The use of composite structures is increasingly common on commercial aircraft. As heralded by the newest generation of commercial aircraft, composites may soon become the predominant material. Composites may be damaged in the course of service. Examples of such in-service damage include impact damage due to hail, runway debris (foreign object damage), or collisions with ground support vehicles.

Referring to FIGS. 1A-1C, the damage may be categorized, for example, as a low energy impact with slight damage (FIG. 1A) or possibly corrosion, a low energy impact with moderate damage (FIG. 1B), or a medium energy impact with severe damage (FIG. 1C). As shown in FIGS. 1A-1C, visual detection may not be an accurate indicator of the degree of damage. Because of the complex structure of composite materials, however, permanent repair methods can be quite involved and are normally undertaken only at appropriate maintenance facilities.

A problem remains as to a course of action when damage is discovered. For example, damage may be discovered at the airport loading gate just prior to a departure. If repair equipment is not available or if the repair may be extensive, the flight might be cancelled. The aircraft may be grounded and taken out of service to be ferried or towed to a maintenance base, with consequent significant economic impact to the aircraft operator.

A "temporary structural repair" may be provided that would restore the damaged area (e.g., applied over the damage instead of removing the damage), to restore the damaged structure to an acceptable strength, until the next major maintenance visit. However, the extent of the damage may need to be determined even as passengers are waiting at the boarding gate, expecting to depart. Without knowledge of the extent of damage, one cannot determine if a temporary repair may restore the structure. For example, if the damage is determined to be superficial, the aircraft may be released for departure.

There are various configurations of composite structural components, and often the method of inspection for each may be quite different. Audible tap testing, considered sufficient to determine sub-surface damage in thin-skinned honeycomb sandwich structures, may be inadequate to evaluate large honeycomb sandwich elements with thick face sheets, such as flaps, landing gear doors, and raked wing tips. Thick solid laminate structures may be common to the majority of the external surface of newer aircraft. A heavy impact may not show significant visually discernable surface damage, but severe hidden delamination and cracking within the structure may have occurred. Thus, various damage repair scenarios must be considered where the damage at a damage site may be difficult or impossible to detect visually (e.g., as illustrated in FIGS. 1A-1C).

Sub-surface inspection of complex composite structures may require sophisticated nondestructive inspection (NDI) devices. However, a trained NDI technician may not be available at the many locations where apparent damage on a structure may be detected. Hence, there remains a need in the art for providing improved NDI services.

SUMMARY

Systems and methods are disclosed for providing nondestructive inspection (NDI) services. More specifically in accordance with an embodiment of the invention, a system for remote inspection includes a nondestructive inspection (NDI) system configured to examine a structure and provide NDI data related to a damage condition of the structure, the NDI system being configured to communicate the NDI data to a remote location; and a remote computer disposed at the remote location, the remote computer being configured to receive the NDI data and provide the received NDI data for a review, the remote computer being configured to communicate an analytical result based on the review to the NDI system, the analytical result including a repair disposition decision corresponding to the damage condition.

In accordance with another embodiment of the invention, a method for remote nondestructive inspection (NDI) includes deploying a NDI system to examine a structure disposed at a first location; operating the NDI system to acquire NDI data related to a damage condition of the structure; transmitting the NDI data to a remote location distant from the first location; formulating a repair disposition decision based on an analysis of the NDI data at the remote location; receiving at the first location the repair disposition decision; and performing an action at the first location consistent with the repair disposition decision.

In accordance with another embodiment of the invention, a method for remote nondestructive inspection (NDI) includes receiving NDI data transmitted from a remote location, the NDI data corresponding to nondestructive inspection of a damage site on a structure at the remote location; evaluating the NDI data to determine a repair disposition decision; and transmitting the repair disposition decision to the remote location.

The scope of the invention is defined by the claims, which are incorporated into this section by reference. A more complete understanding of embodiments of the invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with one or more embodiments of the invention, suspected damage to a composite structural component of a vehicle (e.g., an aircraft) may require more extensive inspection beyond visual or simple measurements. For example, a nondestructive inspection (NDI) device (e.g., a computer controlled commercial NDI device) may be linked to a communications network (e.g., including at least one of a data channel, a video channel, and an audio channel of an aircraft operator company, an airport maintenance site, an original equipment manufacturer (OEM) site, or a service company) to communicate with a remote facility, such as a maintenance base, where NDI device damage data may be received for skilled interpretation.

For the purposes of this disclosure, the term remote can include any separation or distance between the examined structure and the technician at the remote site where the skilled interpreter is not immediately adjacent to the examined structure. Also, the skilled interpreter may be a skilled, certified, or licensed NDI technician competent to provide NDI data evaluation comprising an analytical result that may include technical analysis of the inspection data and a recommendation in the form of a repair disposition decision corresponding to the analytical result.

The repair disposition decision may include a decision to dispatch the aircraft, order a quick composite repair (QCR), or take the aircraft out of service for permanent repair, which may be routed back through the communications link or channel to the personnel at the NDI device. That is, personnel at the aircraft or at the boarding area. The link between the NDI device and the network can be a physical network connection, but it may be preferable to employ wireless network communications to take advantage, for example, of the possible portability of the NDI device.

Figure 1A:
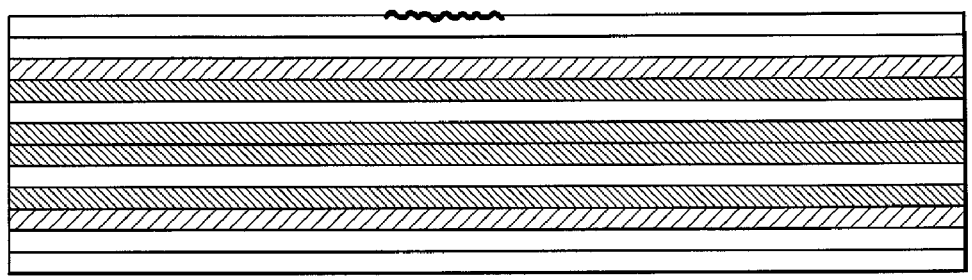
FIGS. 1A-1C show exemplary levels of damage to composite structures in accordance with an embodiment of the invention.
Figure 1B:
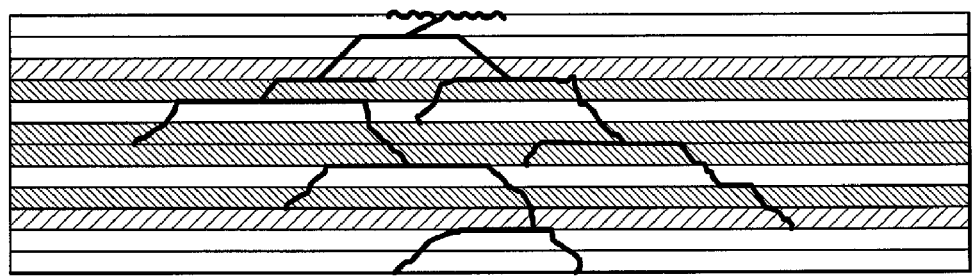
Figure 1C:
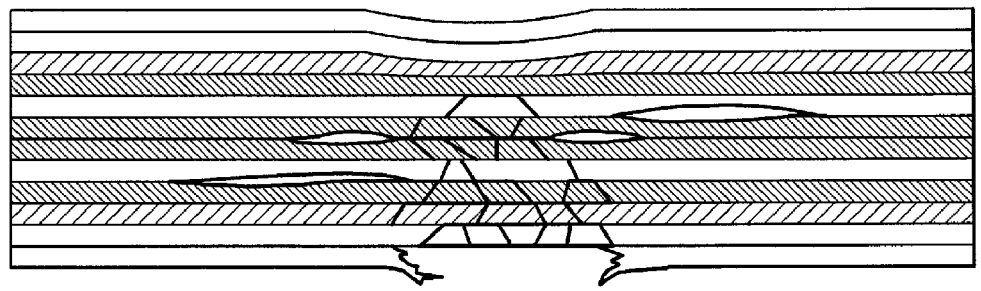
Figure 2A:
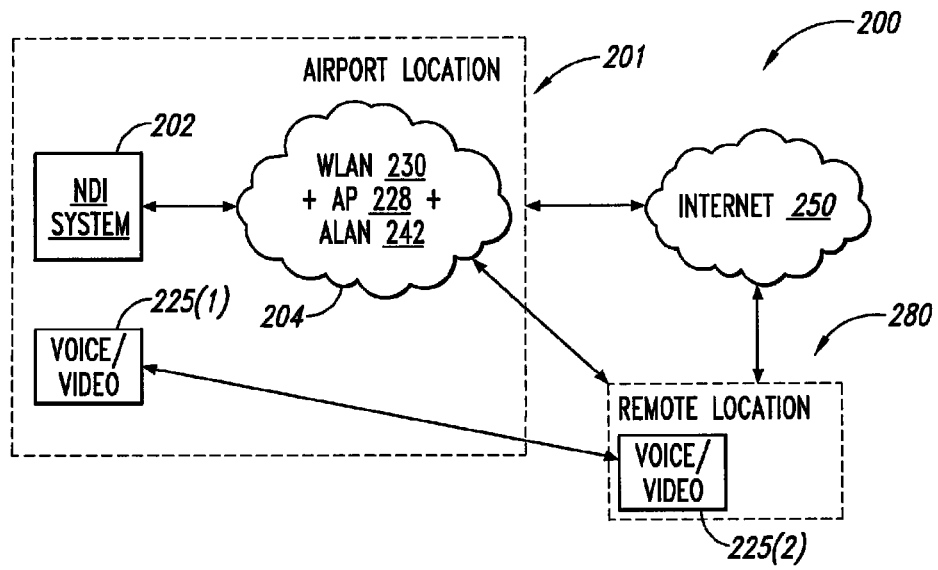
FIGS. 2A and 2B show remote nondestructive inspection systems in accordance with one or more embodiments of the invention.

FIG. 2A shows an inspection system 200 in accordance with an embodiment of the invention. Inspection system 200 includes a first location 201 (i.e. an airport) and a second location 280 (i.e. remote location) at some distance from the first location, which may be linked by a network, such as a network 204 and/or Internet 250. For example, airport location 201 may include one or more NDI systems 202, which link to Internet 250 via an access point 228, a wireless local area network (WLAN) 230, and/or an airport local area network (ALAN) 242. Other network types and/or topologies may be used.

Alternatively, if remote location 280 is also located elsewhere within airport location 201, the communication link between NDI system 202 and remote location 280 may be direct via a dedicated wireless network or may use WLAN 230 and/or ALAN 242 and not require Internet 250. The term remote is relative and may be applied based on the viewpoint of an observer at either the airport location 201 or the remote location 280, where the airport location 201 is considered as remote (at a distance) from the remote location 280 and vice versa. In this manner, the location of each may be considered remote from the other.

Inspection system 200 may further include voice and/or video camera communications over a separate audio/video communications link 225(1), 225(2) between airport location 201 and remote location 280 to facilitate operation of NDI system 202 under the direction of personnel at remote location 280. For example, a mobile phone (e.g., voice) and video camera may be used to aid the placement and operation of NDI system 202. The audio/video communications link 225(1), 225(2) may be provided through the same network 204 used by NDI device 202 or may utilize a different network.

Figure 2B:
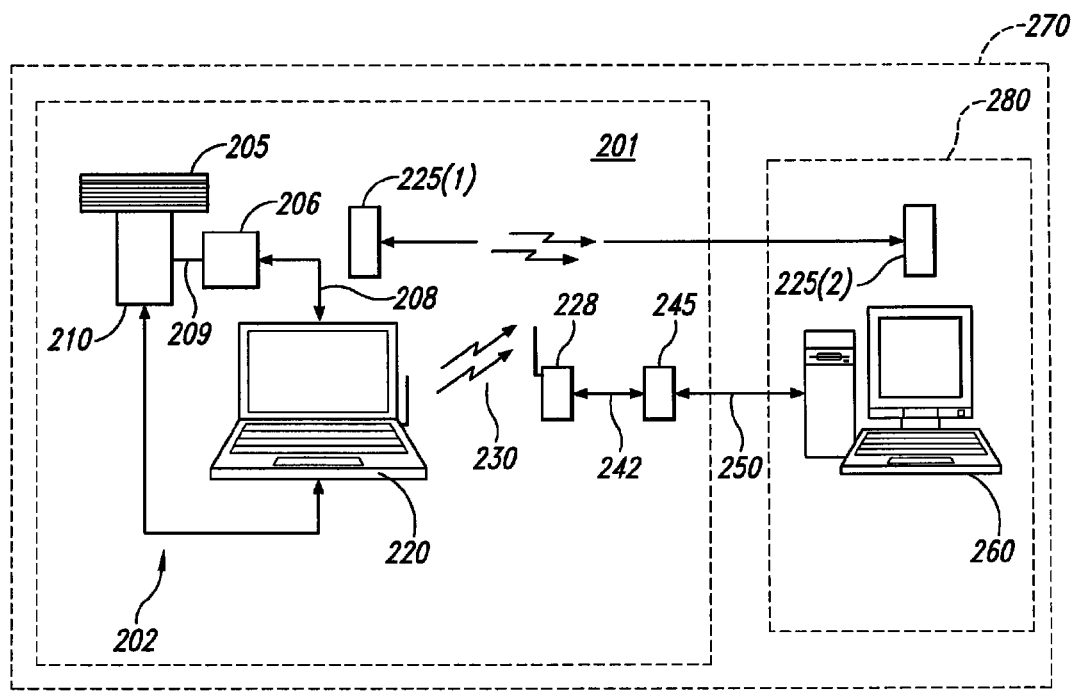

FIG. 2B shows an inspection system 270 in accordance with an embodiment of the invention, which may represent an example of specific implementation details of inspection system 200. For example, NDI system 202 may include one or more of an NDI device 210 coupled to a local computer 220, or local computer system. Alternatively, the separate functions of NDI device 210 and local computer 220 may be combined into a single integrated NDI system 202 with the functional capabilities of both NDI device 210 and local computer 220, including communications (e.g., wireless communications) as described herein.

A section of an aircraft composite structure 205 may be inspected using NDI device 210. NDI device 210 may be capable of producing NDI data, such as images or other forms of data regarding surface and subsurface features of composite structure 205, including internal structure and delamination or cracking damage corresponding to a damage condition of the inspected structure at a damage site. As an example, local computer 220 may be capable of receiving images from NDI device 210, displaying the images, and/or storing the images on a computer readable medium, which may be an internal or external component of local computer 220. Local computer 220 may also be capable of controlling NDI Device 210 with suitable software, depending upon the application.

Local computer 220 may be equipped to transmit the data (e.g., image data) over WLAN 230 to ALAN 242 through access point 228 (e.g., a WLAN/ALAN gateway access node). ALAN 242 may be connected via an ALAN/Internet gateway node 245 to Internet 250. The network link to NDI system 202 may be a wireless network (e.g., WLAN 230) for this example. However, other embodiments that employ hard-wired network connections (e.g., Ethernet) may also be used.

Data from NDI system 202 may be transmitted via Internet 250 (or a dedicated communications link) to a remote computer 260, or remote computer system, at remote location 280, which may be, for example, the maintenance and repair depot at which detailed inspection and evaluation (e.g., NDI inspection) would usually take place. Remote location 280 hosting remote computer system 260 may for example be a site operated by the aircraft manufacturer, the OEM manufacturer of the aircraft component being inspected, an operations/repair facility of the airline company, or a third party service company located on-airport or off-airport. The term remote or the phrase remote inspection may include any arrangement where a skilled interpreter of the NDI data may not be in the immediate vicinity of the inspected object, in this example the aircraft, and requires data to be transmitted from one location to another.

While communication of NDI data may take place via a data network (e.g., network 204), voice (e.g., telephony) and/or video communication may also occur over this network or a separate communication link (e.g., cellular). For example, the on-site personnel may be in communication from audio/video communication link 225(1) with personnel at remote location 280 at audio/video communication link 225(2) (e.g., a phone, s video, or s video conference link). Alternatively, portions of audio/video communication may also take place via data and voice transmitted via networks 204 and/or 250.

An alternative inspection system 270, in accordance with an embodiment of the invention, may include a robotic device 206, or robotic system, capable of direct manipulation 209 of NDI device 210 via commands originating from the local computer 220, via communications 208. Control of robotic device 206 may result from automated procedures included in a computer program operating on local computer 220 or, alternatively, from commands provided by the NDI technician at local computer 220 using, for example, keyboard commands or a joystick controller (not shown). Alternatively, control of robotic device 206 may result from similar commands originating from remote computer system 260 at remote location 280, under the control of automated procedures included in a computer program or, alternatively, from commands provided by the skilled NDI interpreter at local computer 220 using, for example, keyboard commands or a joystick controller (not shown).

Figure 3:
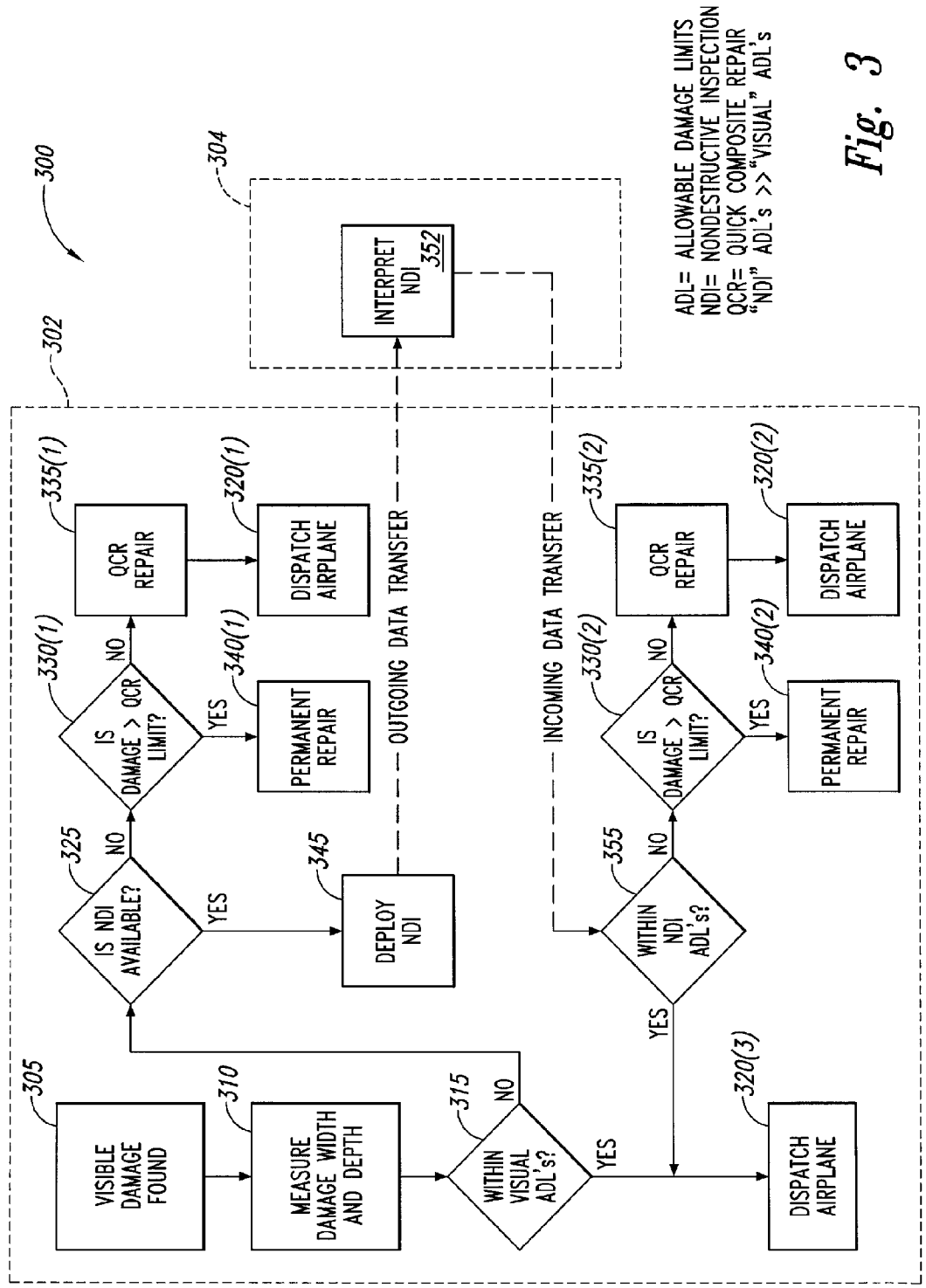
FIG. 3 shows an inspection flow in accordance with an embodiment of the invention.

FIG. 3 shows an inspection flow 300 in accordance with an embodiment of the invention by which remote line maintenance NDI may be performed. For example, an on-site aircraft technician performing routine service on an aircraft at location 302 (i.e. a departure gate) may be notified of the presence of visual damage discovered by a colleague. Alternatively, the on-site aircraft technician may initiate a visual inspection of the aircraft structure and may discover the damage (block 305). The on-site aircraft technician proceeds to visually inspect the damage and may measure the width, depth, and/or length of the damage (block 310).

The visual inspection and measurements (block 310) may be correlated with engineering data showing an assumed subsurface damage distribution (i.e., with the engineering data limits drawn very conservatively). The engineering data limits represent the allowable damage limits (ADLs). For certain structures, a second set of ADLs may also be available based on engineering data. This second set of ADLs may be much less conservative (e.g., making more aircraft available) and based on the availability of NDI device data.

The NDI device data may provide a map of the subsurface damage, establish the absence of subsurface damage, or provide other data beyond that available from mere visual inspection and measurement so that a more informed analysis and appropriate decision made with respect to the damage and aircraft status. In this manner, the analytical result may be determined by a technician who compares the NDI data with engineering data for the examined structure to determine if the NDI data indicates the damage condition is within allowable damage limits. Generally, and in accordance with an embodiment of the invention, the NDI ADLs may be much greater (i.e., much less conservative) than the visual ADLs. This may allow more aircraft to be made available for use with perhaps only a quick or temporary repair rather than having the aircraft grounded for further inspection due to a lack of data regarding the damage.

For example, if the visual measurements fall within visual ADLs (block 315) the aircraft may be released for dispatch (block 320(3)) with no delay. If the damage does not satisfy visual ADLs (block 315), a request may be made for NDI support availability (block 325). If NDI support is available, NDI deployment and communication (block 345) with a remote NDI technician (at a remote location 304 from the aircraft, such as a maintenance base) may proceed, as described further herein. If NDI support is not available (block 325), the damage may still be assessed to determine if the damage may be within quick composite repair (QCR) limits (block 330(1)). If so, the QCR repair may be performed (block 335(1)) and then the aircraft dispatched (block 320 (1)). If not, the aircraft may be sent for permanent repair (block 340(1)) whereby the aircraft may be removed from service and subsequently sent to a maintenance facility for detailed inspection and permanent repair.

For example, while visual ADLs may be exceeded (block 315) to the extent that dispatch (block 320) is not permitted (e.g., the aircraft may not be fit to fly with passengers or cargo), it may be that the damage is not significant and may be amenable to a QCR Repair (block 335) performed on the aircraft at the gate with only minor delay. The QCR limit determination may be made, for example, based on a less conservative set of visual ADLs and using the visual measurements (block 310) and/or based on the data obtained from low-skill NDI devices.

A variety of NDI devices may bring a nondestructive test capability to the airport dispatch environment. Such devices may employ pulse-echo, resonance, tap-testing, ultrasonic imaging, and/or thermographic image detection of damage (e.g., delaminations) in composite structures. An example of an acceptable NDI device is the Acoustocam, a hand-held, portable ultrasonic-camera imaging device (made by Imperium Inc., Silver Springs, Md.).

Some types of NDI devices may produce data that requires skilled NDI technician interpretation and may require comparison to specific engineering data. Consequently, NDI support availability would be required (block 345). However, some types of NDI devices may represent low-skill devices and function as screening devices to simply detect whether subsurface damage may be present. For example, this type of NDI device may provide a red light (indicating some form of subsurface damage and skilled NDI required, e.g., block 345) or a green light (indicating no subsurface damage or abnormality). Thus, some types of NDI devices may be used by the on-site aircraft technician to determine whether the damage simply requires a QCR Repair (block 335), e.g., if visual ADLs (block 315) are exceeded but not QCR limits (block 330), or if skilled NDI technician support and deployment (block 345) may be required.

It should also be understood that NDI support by a skilled NDI technician may provide the most thorough inspection process. However, inspection flow 300 may be modified, for example in accordance with an embodiment, such that QCR damage (block 330) may be performed prior to the NDI support availability check (block 325) if the damage exceeds visual ADLs (block 315). Consequently, NDI support by a trained technician may only be used (block 325 and 345), for example, if visual ADLs and QCR damage limits are exceeded.

If NDI support is available (block 325), NDI deployment and communication (block 345) may proceed. As described above, an on-site aircraft technician acquires data using NDI system 202 (block 345 e.g., as discussed in reference to FIGS. 2A-2B). The NDI data may be provided to remote location 304 (e.g., remote location 280 of FIG. 2A) where NDI data interpretation (block 352) may be accomplished by skilled NDI personnel, with the results of the analysis and/or recommended course of action transmitted back to location 302 (e.g., airport location 201 of FIGS. 2A-2B). In this manner, the skilled NDI technician formulates a repair disposition decision based on an analysis or interpretation of the NDI data transmitted from the first location.

If NDI data interpretation (block 352) determines that the inspected damage is within NDI ADLs (block 355), the aircraft may be released for prompt dispatch (block 320). If the damage exceeds NDI ADLs (block 355) and QCR ADLs (block 330(2)), the aircraft may be removed from service for permanent repair (block 340(2)). However, if the damage does not exceed QCR limits (block 330(2)), QCR Repair may be performed on the aircraft (block 335(2)) at location 302 (e.g., at the gate terminal with only modest delay) and then dispatched (block 320(2)).

The NDI deployment may be implemented by manual inspection by an NDI technician operating NDI system 202, or by using robotic device 206, controlled either locally by local computer 220 at airport location 201 or by remote computer system 260 at remote location, as described. The robotic device 206 may be configured to manipulate at least a part of the NDI device such as an ultrasonic emitter/receiver for moving over the surface of the inspected structure. The robotic device 206 may be controlled at least in part by the local computer, a technician at the local computer, the remote computer, or a second technician at the remote computer.

Figure 4:
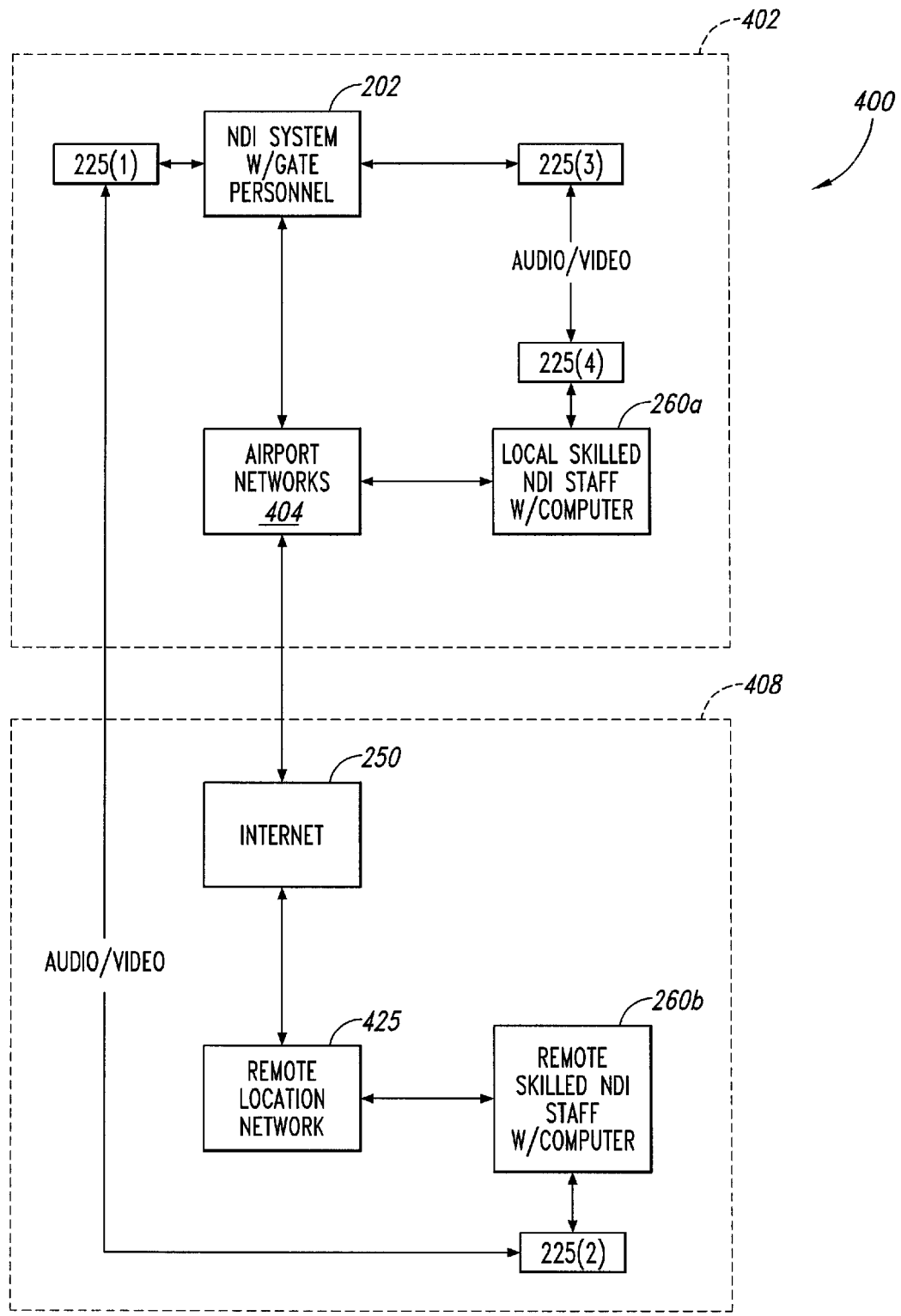
FIG. 4 shows an example of an inspection flow of communication operations between local resources and remote resources in accordance with an embodiment of the invention.

FIG. 4 shows an example of an inspection flow 400 for communications between the location of NDI system 202 (e.g., local resources at the aircraft) and the location of skilled NDI test personnel (e.g., remote resources not at the aircraft) in accordance with an embodiment of the invention. Inspection flow 400 may represent, for example, the flow of communications associated with NDI deployment and communications (block 345 of FIG. 3).

Referring generally to FIGS. 2A to 4, NDI support availability (block 325) may represent a verbal request (e.g., via phone) for NDI deployment and communications (block 345). With NDI system 202 at the aircraft (e.g., airport location 201) and NDI skilled personnel in place at a remote facility (e.g., remote computer system 260b at remote location 280), wireless communications may take place between these locations (e.g., as discussed in reference to FIGS. 2A-2B).

For example, as shown for a location 402 (e.g., airport location), remote computer system 260a may be located at the same airport as the damaged aircraft and, therefore, NDI data and other communications may be wirelessly routed to remote computer system 260a directly through an airport network 404 (e.g., WLAN 230 and/or ALAN 242) and not require Internet 250. However if location 402 does not include remote computer system 260a, then communications must be routed to remote computer system 260b located at a remote location 408 (e.g., an off-airport remote location 280). Therefore, NDI data, interpretation results, and any audio/video communications may be routed via network 404 and Internet 250 and possibly through a remote network 425 of remote computer system 260b.

As noted earlier, the analytical results of NDI inspection by a skilled test technician may be provided to NDI system 202 (e.g., to on-site aircraft personnel). Such data routing may afford automatic capture of the entire data process. Portions of the communications may simultaneously take place via voice and/or video (e.g., via audio/video communications link 225(3)-225(4)). In this manner, information may be routed to critical decision-making personnel.

Figure 5:
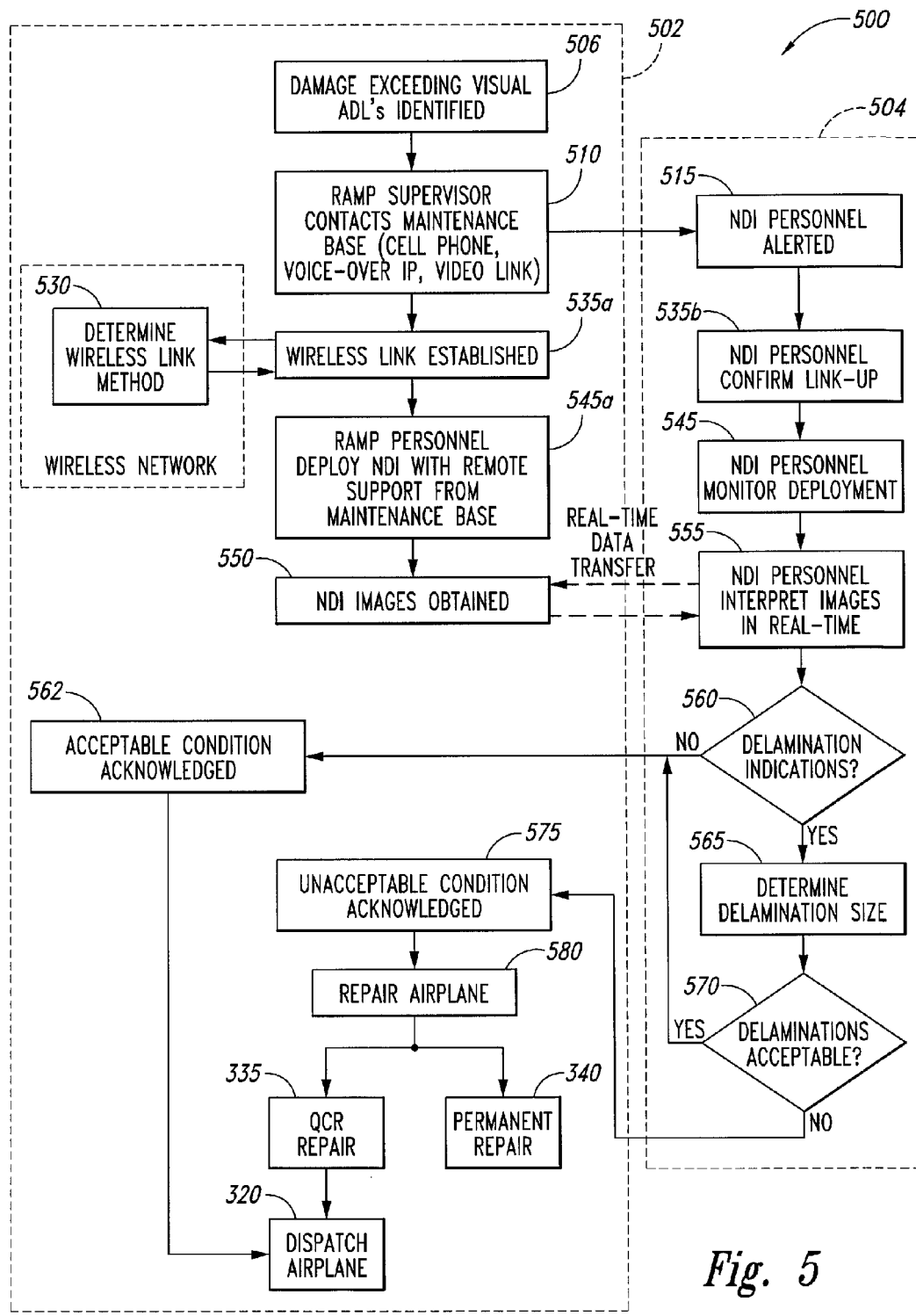
FIG. 5 shows another example of an inspection flow operation in accordance with an embodiment of the invention.

FIG. 5 shows another example of an inspection flow 500 in accordance with an embodiment of the invention. Inspection flow 500 may represent specific implementation details of communications between on-site aircraft operations (block 502) and the remote NDI skilled technicians (block 504) as discussed generally, for example, in reference to FIGS. 2A-4.

When damage exceeds visual ADL limits (block 506), a ramp supervisor (block 510) may provide notice (e.g., via phone, voice over IP, and/or a video link) to alert remote NDI skilled personnel (block 515). A wireless communications link may be established (block 535a) between NDI system 202 and the NDI skilled personnel (e.g., remote computer system 260). The wireless communications link selected (block 530) may depend on the location of the NDI skilled personnel (e.g., on-airport or off-airport resource).

The NDI skilled personnel may then confirm the wireless link-up (block 535b) with NDI system 202 and may further monitor the deployment and remotely assist with the operation of NDI system 202. In this manner, the NDI skilled personnel may provide verbal instructions or other direction to obtain valid NDI data. For example, NDI deployment (block 545) may proceed in cooperation with the NDI skilled personnel monitoring the deployment via phone and/or video link. The acquired NDI data (block 550), such as images or other data, may be transmitted via the selected communications links to the NDI skilled personnel for NDI interpretation and analysis (block 555) in real-time.

As a damage example, if the delamination assessment (block 560) of the NDI skilled personnel is that there is no delamination damage, the NDI skilled personnel may inform the NDI device operator or ramp supervisor (e.g., by phone) who may acknowledge (block 562) the acceptability of the condition and may dispatch the aircraft (block 320). If the delamination assessment (block 560) made by the NDI skilled personnel is that delamination damage does exist, the NDI skilled personnel may make a delamination size determination (block 565). If the delamination size is acceptable (block 570) and no repair is required, the NDI skilled personnel may inform the NDI device operator or ramp supervisor, who acknowledges the analysis (block 562) and may dispatch the aircraft (block 320).

If the delamination size is not acceptable (block 570) and repair is required, the NDI skilled personnel may inform the NDI device operator or ramp supervisor, who acknowledges the conclusion (block 575) that aircraft repair is required (block 580). As discussed previously, the repair may require only a QCR repair (block 335 of FIG. 3) and subsequent dispatch of the aircraft (block 320) or may require the removal of the aircraft from service for permanent repair (block 340 of FIG. 3) at an appropriate maintenance facility.

The ramp supervisor or other personnel at the aircraft location or remote location may authorize the appropriate action, including the appropriate repair action. Furthermore, in conjunction with all final dispatch and repair actions, documentation and reports may be prepared as necessary by responsible persons at location 502 (at the aircraft location) and location 504 (the remote location of the NDI skilled personnel) to meet all requirements of safety and procedures.

Systems and methods are disclosed in accordance with one or more embodiments of the invention to provide NDI services. For example, NDI testing, remote evaluation, and repair decision making for aircraft line maintenance may be provided in accordance with some embodiments. The techniques disclosed herein may provide certain advantages with respect to evaluation and repair decisions that may be made from any location remote from the inspection scene and in time to decide whether to dispatch an aircraft with minimal delay, make a quick temporary repair, or remove it from service for more extensive repair. This may provide significant cost savings when it is determined that a flight can be safely dispatched, rather than cancelled due to a lack of valid inspection data that may lead to an unnecessarily conservative decision on flight worthiness.

Embodiments described above illustrate but do not limit the invention. It should also be understood that numerous modifications and variations are possible in accordance with the principles of the invention. For example, although the embodiments are described with reference to aircraft, and may be more specifically described with reference to composite aircraft structures, one will readily appreciate that the systems and methods described herein may be applicable to any inspection object, including many other structures, materials, and systems. Examples may include, but are not limited to, marine vessels (e.g., in transit or at port), spacecraft, rail transportation vehicles, ground vehicles, automobiles, and fixed standing structures, such as buildings, bridges, tunnels, and the like. Accordingly, the scope of the invention is defined only by the following claims.

We claim:

1. A system for remote inspection, comprising:
a hand-held portable nondestructive inspection (NDI) system including an NDI device configured to examine solid laminate or honeycombed sandwich structure for an aircraft and provide NDI data related to a damage condition of the structure, wherein the NDI device is selected from a group consisting of a pulse-echo NDI device, a resonance NDI device, a tap-testing NDI device, an ultrasonic imaging NDI device, and a thermographic imaging NDI device, the NDI system being configured to communicate the NDI data to a remote location; and
a remote computer disposed at the remote location, the remote computer being configured to receive the NDI data and provide the received NDI data for a review, the remote computer being configured to communicate an analytical result based on the review to the NDI system, the analytical result including a repair disposition decision corresponding to the damage condition, the repair disposition decision including a fly or no-fly decision for the aircraft, wherein the system includes at least one of an audio communication link and a video communication link to the remote computer.

2. The system of claim 1, wherein at least one of the NDI data and the analytical result is being communicated over the at least one of the audio and video communications channels.

3. The system of claim 1, wherein the analytical result is determined by a technician who compares the NDI data with engineering data for the examined structure to determine if the NDI data indicates the damage condition is within allowable damage limits.

4. The system of claim 1, wherein the NDI system further includes:
a local computer operatively coupled to the NDI device and configured to receive the NDI data, wherein the local computer is further configured to transmit the NDI data to the remote computer and receive the analytical result from the remote computer.

5. The system of claim 4, wherein the local computer system is configured to at least one of transmit the NDI data and receive the analytical result via at least one of a wireless local area network, a local area network, and an Internet.

6. The system of claim 4, wherein the remote computer system is configured to least one of receive the NDI data and transmit the analytical result via at least one of a wireless local area network, a local area network, and an Internet.

7. The system of claim 4, wherein the local computer system is configured to provide instructions for controlling the NDI device, the local computer being configured to receive the NDI data and store the NDI data on a computer readable medium.

8. The system of claim 4, further includes a robotic device configured to manipulate the NDI device at least in part, the robotic device being controlled at least in part by one of the local computer, a first technician at the local computer, the remote computer, and a second technician at the remote computer.

9. The system of claim 4, wherein the remote computer is further configured to at least one of store the NDI data on a computer readable medium, display the NDI data in real-time, and transmit the analytical result to the NDI system.

10. A method for remote nondestructive inspection, comprising:
deploying a hand-held portable nondestructive inspection (NDI) system to examine solid laminate or honeycombed sandwich structure for an aircraft disposed at a first location, the NDI system including an NDI device selected from a group consisting of a pulse-echo NDI device, a resonance NDI device, a tap-testing NDI device, an ultrasonic imaging NDI device, and a thermographic imaging NDI device;
operating the NDI device by hand to acquire NDI data related to a damage condition of the structure, the NDI system being associated with a transmitter;
through the transmitter, transmitting the NDI data to a remote location distant from the first location;
requesting NDI remote location support from the first location via at least one of a voice channel and a video channel;
formulating a repair disposition decision based on an analysis of the NDt data at the remote location;
receiving at the first location the repair disposition decision; and
performing an action at the first location consistent with the repair disposition decision.

11. The method of claim 10, wherein deploying the NDI system further comprises providing a robotic device configured to manipulate at least a part of the NDI system, the robotic device being controlled at least in part by at least one of a local computer at the first location, a first technician at the local computer, a remote computer at the remote location, and a second technician at the remote computer.

12. The method of claim 10, wherein the repair disposition decision comprises selecting one of:
dispatching the structure for use without repair;
dispatching the structure for use following a temporary repair; and
removing the structure from use until completion of permanent repair to the structure.

13. The method of claim 12, wherein performing an action at the first location consistent with the repair disposition decision comprises at least one of:
repairing the structure;
dispatching the structure; and
removing the structure from use.

14. The method of claim 10, further comprising:
measuring dimensions of damage to the structure for comparison with allowable damage limits; and
dispatching the structure without deploying the NDI system when results of the measured dimensions of damage are within allowable damage limits.

15. The method of claim 10, wherein the repair disposition decision is received at the first location via at least one of an audio communications channel and a video communications channel.

16. The method of claim 10, further comprising:
providing video images corresponding to the operation of the NDI system to the remote location; and
receiving instructions corresponding to the operation of the NDI system from the remote location.

* * * * *